March 1, 1966 R. F. KALINA 3,237,274
METHOD OF MAKING EXTENDED FOIL CAPACITORS
Filed March 14, 1963
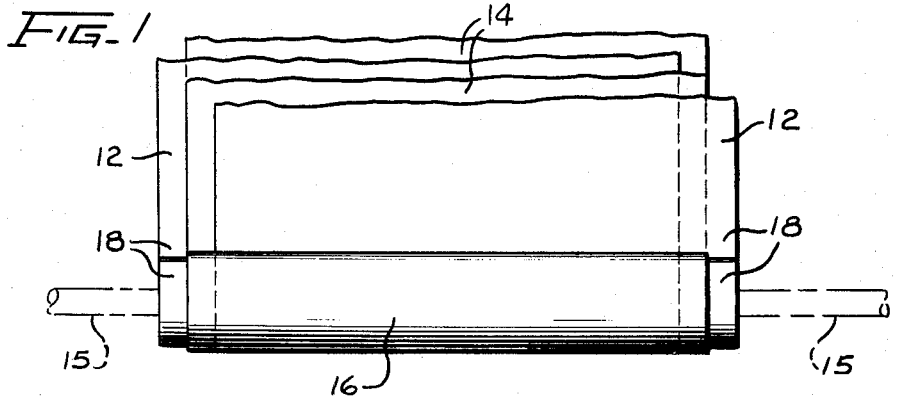
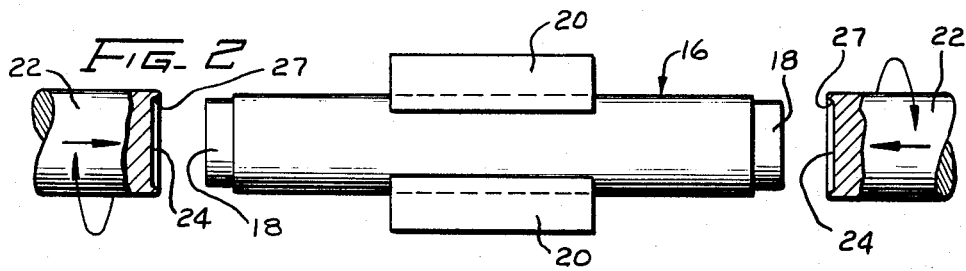
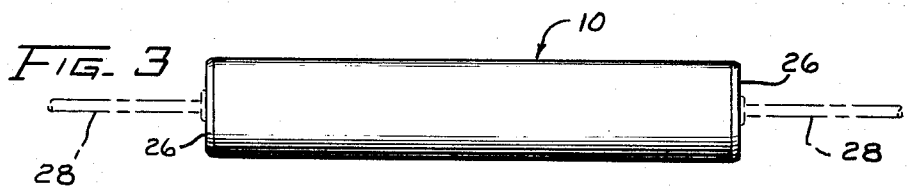
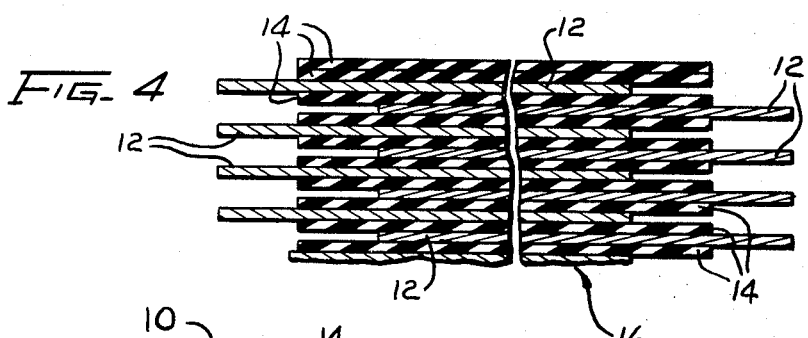
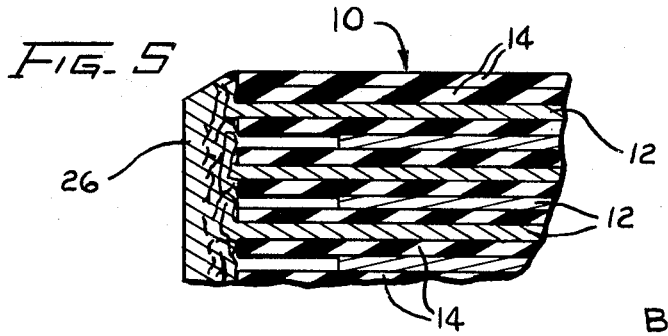
INVENTOR
R.F. KALINA
BY A.C. Schwarz, Jr.
ATTORNEY United States Patent Office 3,237,274
Patented Mar. 1, 1966

3,237,274
METHOD OF MAKING EXTENDED
FOIL CAPACITORS
Robert F. Kalina, Butterfield, Ill., assignor to Western
Electric Company, Incorporated, New York, N.Y., a
corporation of New York
Filed Mar. 14, 1963, Ser. No. 265,110
9 Claims. (Cl. 29—25.42)

This invention relates to the method of making extended foil capacitors, and more particularly to the method of making capacitors having foil electrodes with integral terminals.

An object of the invention is to provide an improved method of making extended foil capacitors.

Another object of the invention is to provide an improved method of making capacitors having foil electrodes provided with terminals formed from the electrodes.

A method of making a capacitor illustrating certain aspects of the invention may include interleaving and superposing a pair of overlapping partially offset foils of tin alloy and a pair of dielectric webs, which webs are capable of being shrunk when heated to a predetermined temperature approaching but below the plastic range temperatures of the foils, and winding the foils and dielectric webs to form a capacitor unit in which a marginal portion of each of the foils extends beyond the dielectric webs and such marginal portions are disposed at opposite ends of the capacitor unit. Thereafter, the capacitor unit is heated to such predetermined temperature to effect the shrinking of the dielectric webs to form a compact capacitor unit.

The capacitor unit is then supported between a pair of dies which are rotated in opposite directions about the axis of the capacitor and are pressed against the ends of the capacitor unit to spin swage the foils and effect the compression and welding together of the extended end portion of the foils individually to form solid disc-like terminals.

Other objects, advantages and novel aspects of the invention will become apparent upon consideration of the following detailed description, in conjunction with the accompanying drawings, in which:

FIG. 1 is a fragmentary view of a plurality of foil electrodes and dielectric webs in superposed relation to each other and with portions thereof wound on an arbor;

FIG. 2 is a diagrammatic view of a wound capacitor unit with the foil electrodes extending from opposite ends thereof and with the capacitor unit supported in a holder between a pair of rotary spin swaging dies;

FIG. 3 is a view of the capacitor after the extending portions of the foil electrodes have been spin swaged into disc-like terminals;

FIG. 4 is an enlarged fragmentary longitudinal sectional view of the capacitor unit before the extending portions of the foil electrodes have been spin swaged; and FIG. 5 is an enlarged fragmentary sectional view of the capacitor after the projecting portions of the foil electrodes have been spin swaged into disc-like terminals for the electrodes.

In the fabrication of a capacitor 10 embodying the present invention a pair of foils 12 of uniform width and a pair of dielectric webs 14 of uniform width are placed in superposed and interleaved relation to each other as shown in FIG. 1 with the dielectric webs 14 in aligned and overlapping relation to each other and with the foils 12 in overlapping and slightly offset relation to each other and to the dielectric webs. The superposed foils and dielectric webs are wound on an arbor 15 to form a capacitor unit 16 in which a marginal portion 18 of each of the foils 12 extends beyond the dielectric webs 14 and such marginal portions are disposed at opposite ends of the capacitor unit. Leading and trailing end portions of the dielectric webs 14 extend longitudinally beyond the ends of the foils, the trailing end portion of the webs being wound around the capacitor unit and sealed thereto.

The foils 12 which form the electrodes of the capacitor are made of a tin alloy or other suitable solder type alloys having a relatively low melting point. The composition of such an alloy may include tin from 40 to 90%, lead from 58 to 8%, and antimony or other ingredients 2%.

The dielectric webs 14 are made of suitable thermoplastic resin, such as polystyrene, or polyethylene terephthalate, which have suitable electrical and physical characteristics and which are capable of being shrunk in at least a longitudinal direction when heated to a predetermined temperature individual to the dielectric web and approaching to but below the plastic range temperatures of the foils.

After being wound the capacitor unit 16 is removed from the arbor and heated to the predetermined temperature to effect the shrinking of the dielectric webs and the compacting of the capacitor unit into a solid structure.

Thereafter the capacitor unit 16 is placed in a holder 20 of a terminal-forming machine indicated diagrammatically in FIG. 2 and is supported thereby between and in coaxial alignment with a pair of rotary spin swaging dies 22. The dies are mounted on motors (not shown) and are rotated thereby in opposite directions. The motors and dies are reciprocated individually by pistons of air-operated actuators (not shown). While rotating at a relatively high speed the dies 22 are moved axially against the ends of the capacitor unit 16 to cause the flat end faces 24 of the dies to compress, spin swage and weld the extended marginal portion 18 of each of the foils into compact disc-like terminals 26 (FIG. 3). Annular flanges 27 formed on the ends of the dies 22 are provided with flared inner surfaces to limit the lateral deformation of the terminals 26.

The axially directed pressure and the frictional wiping or rubbing action of the rotating dies 22 against the extended portions 18 of the foils combine to heat and spin swage each of the extended foil portions 18 into a tightly compacted solid terminal and to melt and weld together the abutting portions of the foil located in a zone adjacent to the outer face of the terminals. This results in the formation of a continuous transversely disposed layer of interwelded metal in each terminal at each end of the capacitor which aids in sealing the capacitor. Thus each foil electrode along its entire length is bonded along one margin thereof to a solid terminal formed integral with the foil from the extended marginal portion thereof. Capacitors thus constructed have a desirable high Q.

Headed or straight leads 28 may be electrically or otherwise heated and attached to the terminals 26 as indicated in FIG. 3.

Although the dielectric webs 14 are described herein as being of the type which is capable of being shrunk when heated to a predetermined temperature it will be understood that the capacitor unit 16 need not be heated to shrink the dielectric webs in order to practice the present method of making capacitors and that dielectric webs of a non-shrinking type may also be used.

It is to be understood that the above-described arrangements are simply illustrative of the application of the principles of this invention. Numerous other arrange-

What is claimed is:

1. A method of making a capacitor which comprises winding a pair of foils and a pair of dielectric webs to form a capacitor unit with the foils supported in insulated and partially overlapping relation to each other and with a marginal portion of each foil extending beyond the dielectric webs and with said marginal portions disposed, respectively, at opposite ends of the capacitor unit; and
spin swaging the ends of the capacitor unit to effect the compression and welding together of the extended portions of the foils into terminals.

2. A method of making a capacitor which comprises winding a plurality of foils and a plurality of dielectric webs to form a capacitor unit with the foils supported in insulated and partially overlapping relation to each other and with a marginal portion of each of the foils extending beyond the dielectric webs and with the extended marginal portions of some of said foils disposed at one end of the capacitor unit and the extended marginal portions of the other of said foils disposed at the other end of the capacitor unit; and
spin swaging the ends of the capacitor unit to effect the compression and welding together of the extended marginal portions of the foils into solid terminals.

3. A method of making a capacitor which comprises winding a pair of foils and a pair of dielectric webs to form a capacitor unit with the foils supported in insulated and partially overlapping relation to each other and with a marginal portion of each foil extending beyond the dielectric webs and with said marginal portions disposed, respectively, at opposite ends of the capacitor unit; and
pressing the ends of the extended portions of the foils in an axial direction with forming dies and simultaneously therewith rubbing the end surface of the extended portion of the foils transversely of the axial direction with the dies to effect the compression of the extended portion of the foils into solid terminals and the interwelding of portions of the foils adjacent the outer surfaces of the terminals.

4. A method of making a capacitor which comprises winding a plurality of foils of tin alloy and of dielectric webs to form a capacitor unit with the foils supported in insulated and partially overlapping relation to each other and with a marginal portion of each of the foils extending beyond the dielectric webs and with the extended marginal portions of some of said foils disposed at one end of the capacitor unit and with the extended marginal portions of the other of said foils disposed at the other end of the capacitor unit; and
pressing the ends of the extended portions of the foils in an axial direction with forming dies and simultaneously therewith rubbing the end surface of the extended portion of the foils transversely of the axial direction with the dies to effect the compression of the extended portion of the foils into solid terminals and the interwelding of portions of the foils adjacent the outer surface of the terminals.

5. A method of making a capacitor which comprises winding a pair of foil electrodes of tin alloy and a pair of dielectric webs to form a capacitor unit with the foil electrodes supported in insulated and partially overlapping relation to each other and with an end portion of each electrode extending from the dielectric webs at an end portion of the capacitor unit and with said end portions of said electrodes disposed, respectively, at opposite ends of the capacitor unit; and
pressing rotating members against the ends of the extended foil electrodes in an axial direction to effect the circular and axial compression of the extended portion of the foil electrodes into compact disc-like terminals and the welding together of portions of the foils adjacent the end surfaces of the terminals.

6. A method of making a capacitor which comprises interleaving a pair of foils and a pair of dielectric webs which webs are capable of being shrunk at least in the longitudinal direction upon being heated to a predetermined temperature approaching but below the plastic range temperatures of the foils, and winding the foils and the webs to form a capacitor unit with the foils supported in insulated and partially overlapping relation to each other and with a marginal portion of each foil extending beyond the dielectric webs and with said marginal portions disposed, respectively, at opposite ends of the capacitor unit;
heating the capacitor to such predetermined temperature to effect the shrinking of the dielectric webs to form a compact capacitor unit; and
spin swaging the extended portion of each foil to effect the compression and the welding together of the extended portion of the foil into a solid terminal.

7. A method of making a capacitor which comprises interleaving a plurality of foils and a plurality of dielectric webs which webs are capable of being shrunk at least in the longitudinal direction upon being heated to a predetermined temperature approaching but below the plastic range temperatures of the foils, and winding the foils and the webs to form a capacitor unit with the foils supported in insulated and partially overlapping relation to each other and with a marginal portion of each foil extending beyond the dielectric webs and with the extended marginal portions of some of said foils disposed at one end of the capacitor unit and the extended marginal portions of the other of said foils disposed at the other end of the capacitor unit;
heating the capacitor to such predetermined temperature to effect the shrinking of the dielectric webs to form a compact capacitor unit; and
spin swaging the ends of the capacitor unit to effect the compression of the foils into compact disc-like terminals and the interwelding of portions of the foils adjacent the end surfaces of the terminals.

8. A method of making a capacitor which comprises interleaving a pair of foils of tin alloy and a pair of dielectric webs which webs are capable of being shrunk at least in the longitudinal direction upon being heated to a predetermined temperature approaching but below the plastic range temperatures of the foils, and winding the foils and the webs to form a capacitor unit with the foils supported in insulated and partially overlapping relation to each other and with a marginal portion of each foil extending beyond the dielectric webs and with said marginal portions disposed, respectively, at opposite ends of the capacitor unit;
heating the capacitor unit to such predetermined temperature to effect the shrinking of the dielectric webs to form a compact structure; and
pressing the ends of each foil in an axial direction and simultaneously therewith rubbing the end surface of the extended foil electrodes transversely of the axial direction to effect the compression and the welding together of the extended portions of the foil into a terminal.

9. A method of making a capacitor which comprises winding a pair of foil electrodes of tin alloy and a pair of dielectric webs to form a capacitor unit with the foil electrodes supported in insulated and partially overlapping relation to each other and with a marginal portion of each electrode extending beyond the dielectric webs and with said marginal portions disposed, respectively, at opposite ends of the capacitor unit; and
pressing members against the ends of the extended foil electrodes in an axial direction and effecting relative rotation between the members and the capacitor unit to effect the circular and axial compression of the extended portion of the foil electrodes into compact disc-like terminals and the welding together of portions of the foils adjacent the end surfaces of the terminals.

References Cited by the Examiner

UNITED STATES PATENTS

| | | | |
|---|---|---|---|
| 774,115 | 11/1904 | Splitdorf | 317—260 |
| 859,923 | 7/1907 | Davis | 317—260 |
| 1,118,110 | 11/1914 | Francisci | 78—53 |
| 2,627,645 | 2/1953 | Harris | 29—25.42 |
| 2,651,100 | 9/1953 | Grouse | 29—25.42 |
| 2,726,561 | 12/1955 | Hill | 78—89 |
| 2,903,780 | 9/1959 | Barnard | 29—25.42 |
| 3,150,301 | 9/1964 | Schils | 29—25.42 |

RICHARD H. EANES, JR., *Primary Examiner.*

JOHN T. BURNS, *Examiner.*